United States Patent [19]

Dannenberg

[11] Patent Number: 5,036,327
[45] Date of Patent: Jul. 30, 1991

[54] SINGLE OSCILLATOR FSK PULSED RADAR RECEIVING TRANSMITTER

[75] Inventor: Paul H. Dannenberg, Blaine, Minn.

[73] Assignee: Honeywell Inc., Minneapolis, Minn.

[21] Appl. No.: 554,548

[22] Filed: Jul. 19, 1990

[51] Int. Cl.$^5$ .............................................. G01S 13/26
[52] U.S. Cl. .................................. 342/201; 342/175; 342/98; 342/100
[58] Field of Search ..................... 342/201, 98, 99, 100

[56] References Cited

U.S. PATENT DOCUMENTS

| | | | |
|---|---|---|---|
| 4,313,183 | 1/1982 | Saylors | 367/128 |
| 4,689,623 | 8/1987 | Schwab et al. | 342/39 |
| 4,888,595 | 12/1989 | Friedman | 342/457 |
| 4,899,158 | 2/1990 | Saeki et al. | 342/44 |

Primary Examiner—Thomas H. Tarcza
Assistant Examiner—John B. Sotomayor
Attorney, Agent, or Firm—Haugen and Nikolai

[57] ABSTRACT

An improved radar receiver transmitter uses a single oscillator frequency shift keyed system in which the oscillator shifts rapidly between a pulsed output frequency and a local frequency such that the system can transmit at one frequency and shift fast enough such that when the echo pulse is received, the transmitter is operating at the local frequency desired. The two signals are demodulated in a mixer to establish the desired intermediate frequency which then may be processed to produce the desired output. Extremely fast shifting is accomplished by a gallium arsenide oscillator in conjunction with a varactor diode which responds to a modulator pulse.

10 Claims, 2 Drawing Sheets

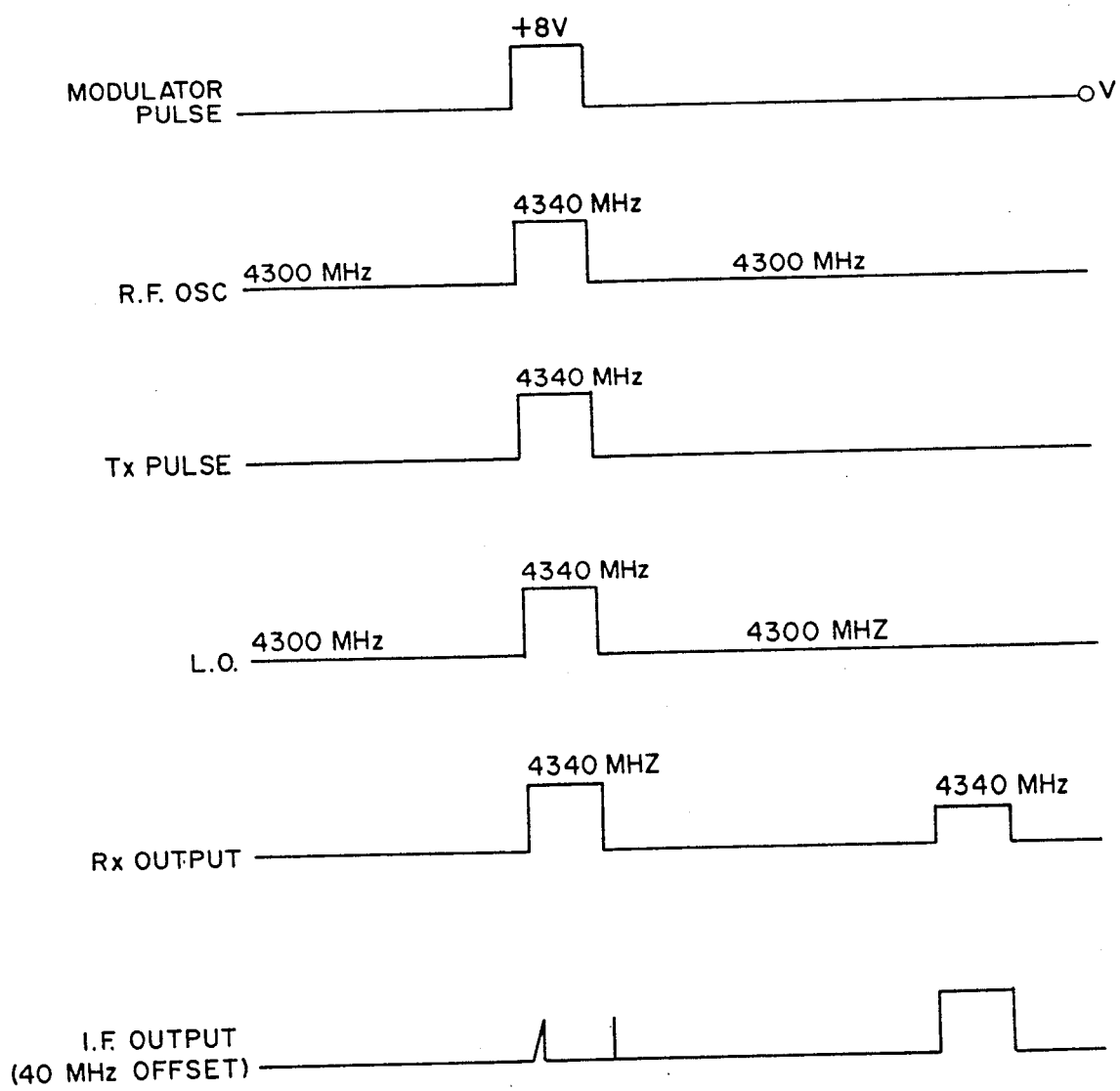

SINGLE OSCILLATOR FSK PULSED RADAR RECEIVING TRANSMITTER

BACKGROUND OF THE INVENTION

I. Field of the Invention

The present invention is directed generally to pulsed radar receiving transmitters and, more particularly, to an improved radar receiver transmitter using a single oscillator frequency shift keyed system.

I. Description of the Related Art

Because of different characteristics of high and low frequency RF signals with respect to RF transmission and internal signal processing, most high gain systems utilize some type of a frequency-changing scheme. In such a system, the echo radar signal, in the case of a radar system, or other incoming signal of interest to be received is brought in from the antenna, amplified and mixed with a locally generated signal differing in frequency from it by a predetermined constant amount spoken of as the intermediate frequency. The intermediate frequency (IF) is a much lower frequency than the transmitted/received signal and so it is easier to amplify and tune for use as a video signal output, or the like. A signal processing system employing a frequency changer and intermediate-frequency amplifier for the mixer output is generally known as a superheterodyne system.

In the past, there have been systems which have been developed utilizing zero IF. In these systems, the signal of interest is transmitted and the echo received at one frequency and a local oscillator is provided which runs at the same frequency. Because the frequencies are the same it is called a zero IF system. It is well known that it is generally more difficult to accurately process the high frequency signal components in a receiver; and, therefore, because the zero IF systems work with the full frequency signal, those systems must be designed to work with relatively low frequency transmissions. Zero IF systems further require IF amplifiers with large low frequency capacitors and have difficulties with regard to leakage signals and pulses if one attempts to use them with a system equipped with a single antenna and a circulator, thereby making them undesirable from these standpoints.

Because of difficulties encountered with the zero IF systems and certain other benefits obtained with superheterodyne systems, systems utilizing an offset intermediate frequency are preferred. Known systems of this type typically are provided with two oscillators. One of the oscillators operates at the high frequency of the radar pulse or other signal transmitted and received external to the signal processing environment. The other oscillator generates another high frequency local signal offset from the transmitter signal by a small known amount. In order for the intermediate frequency to remain constant, however, these two oscillators must frequency track or remain constant in frequency output relative to each other over wide temperature, humidity and other environmental ranges. They also have to remain fairly stable. To create oscillators with the required characteristics or to add compensation or correcting circuitry to the system to accomplish tracking over a preferred fairly narrow bandwidth results in a very complicated and costly device. As an alternative, some of these devices have utilized a very wide band with intermediate frequencies so that if the IF frequency varies a little bit over a temperature range, for example, the system will function reasonably well. Sensitivity is lost, however, because the wider bandwidth allows more noise to go through the system.

Problems of this nature are particularly noticeable in systems which must operate accurately over a fairly wide range of environmental conditions with relatively great accuracy. Devices of this type include, for example, radar altimeters. Accordingly, there remains a need for a relatively simple, yet stable system which combines the tracking advantages of a single frequency with the sensitivity and discrimination of a superheterodyne system.

SUMMARY OF THE INVENTION

In accordance with the present invention, the problems associated with tracking utilizing a plurality of oscillators and difficulties with zero IF systems are solved by the provision of a relatively simple, low cost single oscillator frequency shift keyed (FSK) pulse receiver transmitter system. The system of the invention utilizes a single oscillator having the ability to shift rapidly between a pulsed output frequency and a local frequency such that the device can transmit at one frequency and then shift oscillator output frequency fast enough such that when the echo pulse is received, the transmitter is operating at the local frequency desired to establish the proper offset intermediate frequency in what is essentially a superheterodyne system. In the preferred embodiment, the system uses a gallium arsenide oscillator in conjuction with a varactor diode which, in turn, reacts to a modulator pulse to shift the frequency of the gallium arsenide oscillator between the desired radar pulse frequency and the background or local frequency. In the transmitting mode, the gallium arsenide radio frequency oscillator is coupled thorough a power amplifier to a transmitting antenna which emits the pulsed signal of interest. The return or echo signal is detected by a receiving antenna and fed through a low noise RF amplifier into a mixer where the intermediate or beat frequency is extracted from a modulation of the local frequency and the pulse frequency. This signal is then amplified used as the output, which may be a video signal, for the device. Preferably the system uses a circulator in conjunction with a single antenna for both transmission and reception.

It has been discovered that gallium arsenide oscillators in combination with varactor diodes can be made to shift frequencies extremely rapidly, i.e., in 3 or 4 nanoseconds, such that a short radar pulse can be transmitted and when the echo is received, the oscillator will be at the local frequency. In other words, the delay in the reception path itself is generally greater than the switching time of the oscillator. Of course, controlled delays may be added or built into the circuitry if necessary. An additional benefit of the system of the present invention lies in the fact that when the pulse of interest is transmitted, the local oscillator signal is at the same frequency as the pulse. This means that direct reflections back from the transmitting antenna or any internal leakage in the system will also be at the pulsed frequency; and, therefore, it will produce a zero IF or zero beat, or in effect, be nulled.

BRIEF DESCRIPTION OF THE DRAWINGS

In the drawings where like numerals are utilized to designate like parts throughout the same:

FIG. 2 is a timing diagram illustrating coordination of the signals from the single oscillator within the receiver transmitter system.

DETAILED DESCRIPTION

Figure 1:
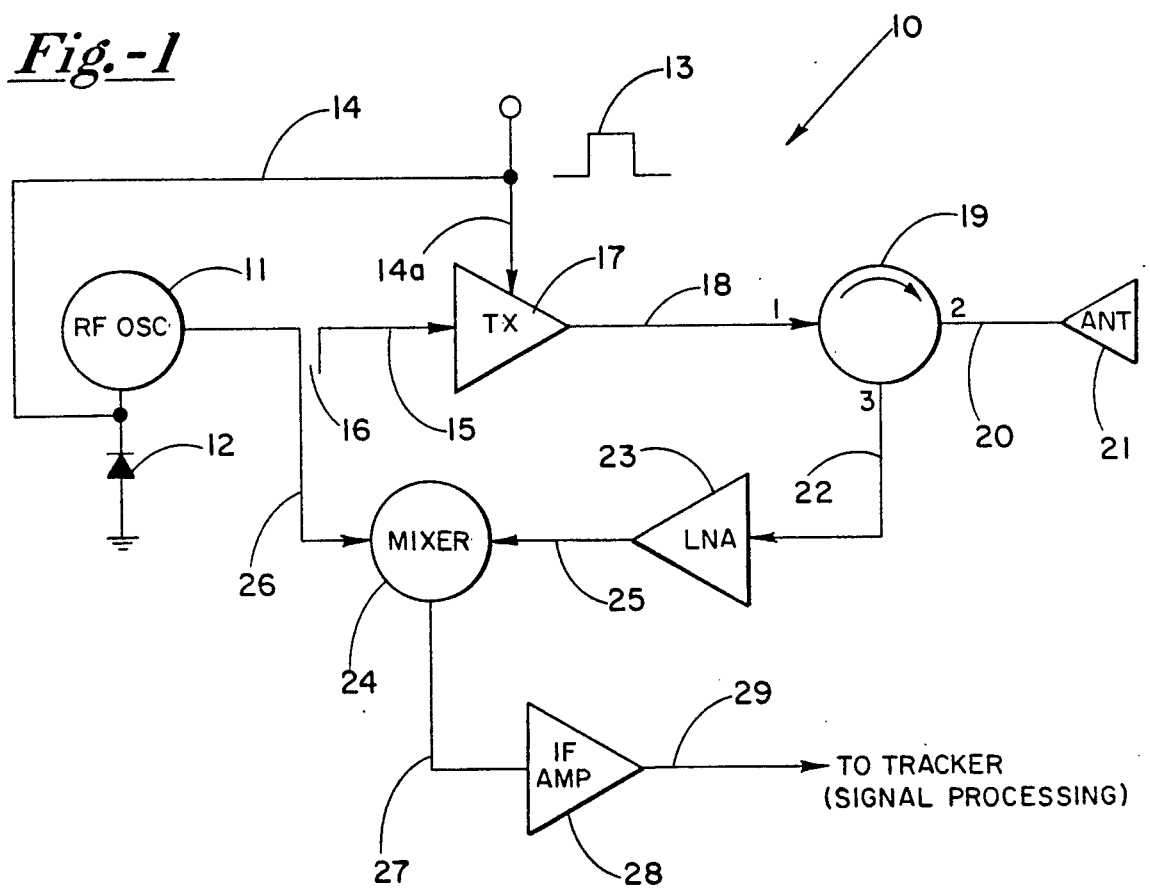
FIG. 1 is a schematic diagram of a typical single oscillator frequency shift keyed pulsed radar receiver transmitter system in accordance with the invention.

The single oscillator frequency shift keyed pulse radar receiver transmitter system of the present invention is particularly described with reference to a preferred embodiment utilizing a gallium arsenide RF oscillator in conjunction with a varactor diode operated by a modulator pulse in a typical superheterodyne type receiver transmitter system. This embodiment is intended to be representative rather than limiting with respect to the other uses of the inventive concepts. With this in mind, the invention will next be described in considerable detail with reference to that embodiment.

FIG. 1 depicts a schematic diagram of a single oscillator FSK pulse radar receiver transmitter. The system, shown generally at 10, includes a radio frequency (RF) oscillator device 11 which is operated in conjunction with a varactor diode device 12 in conjunction with a modulation pulse indicated as an input 13 on line 14. The output of the RF oscillator 11 to be transmitted externally is coupled to line 15 by a device such as a 3 dB coupler 16 in a well known manner. The signal to be transmitted proceeds through a power or boost amplifier (TX) 17, via 18 to a transmitting/receiving circulator 19 and via 20 to a dual purpose antenna 21. Echoes or incoming signals received by antenna 21 are, in turn, conducted via 20 back to circulator 19 which directs them via pin 3 and line 22 to low noise radio frequency amplifier (LNA) 23 and thereafter to balanced mixer 24 via conductor 25. Signals generated by the RF oscillator 11 are also conducted via 26 to the mixer 24. The offset or demodulated intermediate frequency output from the mixer 24 is conducted via 27 to IF amplifier 28 where it is amplified to provide a video output 29 or other signal which proceeds to a signal processing system in a well known manner.

The RF oscillator 11 is preferably one made of gallium arsenide chosen to operate in the desired frequency range. The frequency range illustrated by the preferred embodiment is approximately 4300 Mhz which represents a typical frequency for such a device. The selection of an RF oscillator substantially consisting of gallium arsenide was made, in part, because of the frequency stability associated with that material and the fact that it could be readily tuned within the desired frequency range. Using the oscillator in conjunction with the varactor diode in accordance with the invention, however, has produced an extremely stable, extremely rapidly shifting oscillator system not previously achieved utilizing a single oscillator. The oscillator, in addition, is fairly high-Q.

The combination of stability in the oscillator and the ability to rapidly shift the frequency of the oscillator present a distinct advantage. Most of the remaining components of the single oscillator FSK radar receiver transmitter of the invention are generally quite familiar to those skilled in the art. The low noise amplifier 23 may also be of gallium arsenide having about 14 to 16 dB gain. The typical device has about 14 to 16 dB gain with an effective noise figure of about 3½ dB. In addition, the mixer may be a standard balanced mixer and may also be of gallium arsenide having several stages. Minor fluctuations in the local oscillator amplitude generally are balanced out in such a mixer in a well known manner.

It has been found that when a varactor diode is utilized with a zero to 8 volt modulating pulse in conjunction with such an oscillator that the oscillator can be shifted in as little as 3 or 4 nanoseconds. The normal circuit delay in receiving echo signal is a minimum of 20 to 30 nanoseconds, and normally 40 to 100 nanoseconds, so that the system will work well with fairly narrow pulses. If wider pulses are desired, any desired time delay can be built into the system using techniques well known to those skilled in the art.

In the manner described above, the signal oscillator services both the transmitter and the required local oscillator for the superheterodyne system in a time sharing manner. As illustrated in FIG. 1 and in the timing diagram of FIG. 2, the RF oscillator operates at a frequency of 4300 MHz if no voltage is applied to the varactor diode 12. The RF oscillator feeds both the transmitter power amplifier and the mixer. When the transmitter power amplified is activated by a modulation pulse on line 14A, the same pulse at an 8 volt level is applied to the varactor diode via 14. The 8 volt pulse causes the capacitor to the diode to change which, in turn, shifts the frequency of the oscillator to 4340 MHz or generation of the transmitter output pulse. During the transmission period, the local oscillator input to the mixer is also 4340 MHz so that the leakage energy which occurs during transmission is demodulated by the mixer at zero frequency.

The transmitted signal, which reflects off any nearby objects or terrain, is delayed in time and returns at the transmitted frequency of 4340 MHz. This is illustrated by the RX output line on the timing diagram. It can be further seen from the timing diagram that whereas the relatively weaker return signal is at 4340 MHz, the RF oscillator has returned to 4300 MHz and the mixer now modulates the weak return signal at a 40 MHz offset or intermediate frequency which is easily amplified can pass with optimum gain. The result, of course, is that the system rejects the unwanted leakage signals during transmission and amplifies the return signal for further signal processing by a range computer, or the like.

Thus, as described above, one of the great benefits of the system of the invention is that at the time of the output pulse, the transmitter pulse is at 4340 MHz and any internally reflected or other stray signals will also be at 4340 MHz as will the local oscillator. Therefore, anything reflects back or circulator leaks into the system is demodulated at zero frequency or zero beat by the mixer which, in effect, operates almost as a self-filter. It filters out the unwanted leakage signal within the device which means that you don't need to be as concerned with internal sealing as in prior devices. This should be kept in mind simply because with respect to the circulator 19, the best insulation which is available is approximately 20 dB. The signal reflected from the antenna or circulator at the time of transmission gets rejected by the intermediate frequency amplifier to the tune of about 35 to 40 dB so that in this manner the unwanted signals are readily weeded out at least a few nanoseconds in advance of the return of the desired or good signal.

The only situation in which the system of the present invention exhibits reduced sensitivity occurs when the signal target distance is extremely small such that the signal is reflected back before the system is ready to process it. This can be alleviated by the provision of certain time delay components in the incoming signal processing circuits. This occurs generally in situations where the ground range is very short, i.e., 0 to 50 feet.

With respect to the operation of the dual frequency system of the invention, it should also be kept in mind that the system operates very well so long as the range of frequencies stays within the antenna passband which is approximately 100 to 200 MHz. In this range, using a single oscillator, there need not be any frequency tracking of the oscillator or any compensation or correction applied.

It can thus be seen in accordance with the present invention that an accurate radar signal processing system can be accomplished utilizing a single RF oscillator without the need for frequency tracking or temperature compensation. The system exhibits good sensitivity even with poor RF isolation and requires minimal control of internal leakage. It has been found that frequency diversity reduces the mutual interference by as much as 50%. The system is extremely low cost compared to other system inasmuch as, many costly components are not required. A second oscillator, frequency tracking circuitry and the need for temperature compensation are eliminated. For example, no STC or buffer amplifiers are required.

The illustrative embodiment has been described in considerable detail in order to comply with the Patent Statutes and to provide those skilled in the art with the information needed to apply the novel principles and to construct and use such specialized components as are required. However, it is to be understood that the invention can be carried out by modified or specifically different embodiments and that one skilled in the art can make numerous revision and adaptations of the invention and that such variations and modifications both as to equipment detail and operating procedures can be accomplished without departing from the scope of the invention itself.

What is claimed is:

1. A single oscillator frequency shift keyed radar receiver transmitter comprising
   single oscillator means for generating RF signals at least a first and a second frequency, the first and second frequencies being relatively close together;
   oscillator frequency shifting means for shifting the frequency of the oscillator between the first and the second frequencies;
   control means for controlling the timing and frequency shifting of the single oscillator means;
   transmitter means for transmitting intermittent pulsed signals of the first frequency;
   receiver means for receiving echo signals of the transmitted pulses of the first frequency;
   mixer means for receiving signals of the first frequency conducted from the receiving means and the signals generated by the oscillation means at the second frequency locally and producing an intermediate frequency output therefrom based on the difference between the first and second frequencies; and
   signal processing means for processing the intermediate frequency.

2. The apparatus of claim 1 wherein the single oscillator means is a gallium arsenide oscillator.

3. The apparatus of claim 2 wherein the oscillator frequency shifting means is a varactor diode.

4. The apparatus of claim 3 wherein the control means includes modulator pulse generating means connected to the varactor diode for generating a modulation pulse to shift the frequency of the oscillator for the duration of the pulse.

5. The apparatus of claim 4 wherein the modulation pulse further turns on the transmitter means so that the pulse is transmitted as a radar signal.

6. The apparatus of claim 5 wherein the transmitter means further comprises a power amplifier which is turned on by the modulator pulse.

7. The apparatus of claim 1 wherein the mixer means is adapted to receive all RF signals generated by the oscillator means locally and the signals of the first frequency are pulsed in a manner such mixer receives the first frequency when the first frequency is being transmitted and the second frequency when the echo signal of the first frequency is received and produces the intermediate frequency from the difference therein.

8. The apparatus of claim 3 wherein the mixer means is adapted to receive all RF signals generated by the oscillator means locally and the signals of the first frequency are pulsed in a manner such that the mixer receives the first frequency when the first frequency is being transmitted and the second frequency when the echo signal of the first frequency is received and produces the intermediate frequency from the difference therein.

9. The apparatus of claim 4 wherein the mixer means is adapted to receive both the first and second RF signals generated by the oscillator means locally and the signals of the first frequency are pulsed in a manner such that the mixer receives the first frequency when the first frequency is being transmitted and the second frequency when the echo signal of the first frequency is received and produces the intermediate frequency from the difference therein.

10. The apparatus of claim 4 wherein the transmitter means and the receiver means utilize a common antenna and further comprising circulator means associated with the antenna means for directing incoming and outgoing signals.

* * * * *

UNITED STATES PATENT AND TRADEMARK OFFICE
CERTIFICATE OF CORRECTION

PATENT NO. : 5,036,327
DATED      : July 30, 1991
INVENTOR(S): Paul H. Dannenberg It is certified that error appears in the above-identified patent and that said Letters Patent is hereby corrected as shown below:

In column 6, line 28, after "such", insert -- that the -- .

In column 5, line 45, after "at", insert an additional -- at -- .

Signed and Sealed this

Twenty-second Day of November, 1994

Attest:

BRUCE LEHMAN

Attesting Officer

Commissioner of Patents and Trademarks